US006608867B2

United States Patent
Zhong et al.

(10) Patent No.: US 6,608,867 B2
(45) Date of Patent: Aug. 19, 2003

(54) DETECTION AND PROPER SCALING OF INTERLACED MOVING AREAS IN MPEG-2 COMPRESSED VIDEO

(75) Inventors: Zhun Zhong, Croton on Hudson, NY (US); Tse-hua Lan, Ossining, NY (US); Yingwei Chen, Briarcliff Manor, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 272 days.

(21) Appl. No.: 09/823,361

(22) Filed: Mar. 30, 2001

(65) Prior Publication Data

US 2003/0012276 A1 Jan. 16, 2003

(51) Int. Cl.[7] .................................................. H04N 7/12
(52) U.S. Cl. ................. 375/240.2; 348/395.1; 382/250
(58) Field of Search ........................ 375/240.18, 240.13, 375/240.2; 348/395.1, 413.1, 416.1; 382/249, 250

(56) References Cited

U.S. PATENT DOCUMENTS

| 5,742,343 A | 4/1998 | Haskell et al. |
|---|---|---|
| 5,874,995 A | 2/1999 | Naimpally et al. |
| 6,057,884 A | 5/2000 | Chen et al. |
| 6,104,753 A | * 8/2000 | Kim et al. .................. 375/240 |
| 6,108,448 A | 8/2000 | Song et al. |

FOREIGN PATENT DOCUMENTS

| DE | 29802014 U | 6/1998 | ............ A61B/6/02 |
|---|---|---|---|
| DE | 10008700 A | 11/2000 | ............ F16C/29/06 |
| EP | 0430338 A1 | 6/1991 | ............ A61B/6/02 |

* cited by examiner

*Primary Examiner*—Chris Kelley
*Assistant Examiner*—George A Bugg, Jr.
(74) *Attorney, Agent, or Firm*—Ernestine C. Bartlett

(57) ABSTRACT

The present invention provides a method of and system for determining whether a local area of a compressed video stream represented by a plurality of DCT encoded blocks subject to decoding and filtering/scaling is a stationary area or an interlaced moving area. Further, given such information, the invention relates to dynamically switching between frame- or field-based operations in a smart way, thus optimizing the output picture quality. Also, a DCT-domain-filtering scheme for field-based filtering/scaling of frame-DCT data is provided herein.

14 Claims, 6 Drawing Sheets

| 0' | 1' | 2' | 3' | 4' | 5' | 6' | 7' |
|---|---|---|---|---|---|---|---|
| 8' | 9' | 10' | 11' | 12' | 13' | 14' | 15' |
| 16' | 17' | 18' | 19' | 20' | 21' | 22' | 23' |
| 24' | 25' | 26' | 27' | 28' | 29 | 30' | 31' |
| 32' | 33' | 34' | 35' | 36' | 37' | 38' | 39' |
| 40' | 41' | 42' | 43' | 44' | 45' | 46' | 47' |
| 48' | 49' | 50' | 51' | 52' | 53' | 54' | 55' |
| 56' | 57' | 58' | 59' | 60' | 61' | 62' | 63' |

49 — LEFT-MIDDLE (→ 32')

48

LEFT-BOTTOM (→ 56')

DETECTION AND PROPER SCALING OF INTERLACED MOVING AREAS IN MPEG-2 COMPRESSED VIDEO

FIELD OF THE INVENTION

The present invention relates generally to decoding/decompression of compressed video in the discrete cosine transform ("DCT") domain, and more particularly to methods of and systems for detection and proper filtering/scaling of interlaced moving areas in MPEG-2 encoded video.

BACKGROUND OF THE INVENTION

MPEG is an abbreviation for Moving Pictures Experts Group. MPEG was formed in 1988, originally to create a standard for compressing motion video. The need for compression of motion video for digital transmission becomes apparent with even a cursory look at uncompressed bitrates in contrast with bandwidths available. Full-motion video requires a large amount of storage and data transfer bandwidth. The standard U.S. broadcast television signal, sometimes referred to as an "NTSC" signal, has a bitrate of 168 Megabits ("Mbits") per second. By comparison, transmission of five-channel stereo uncompressed audio, for example, requires a bitrate of 3.5 Megabits per second. A single-speed CD-ROM delivers data at a bitrate of 1.5 Mbits per second.

The first goal for the MPEG group was to compress video together with audio into a CD-ROM-sized bandwidth of 1.5 Mbits per second. The result of their work is the MPEG-1 encoding standard, completed in 1991. At that time video compression technology embodied in MPEG-1 had still not attained the ability to encode broadcast-quality interlaced video. This became a primary goal for the MPEG-2 standard.

Interlaced video describes a scanning system for video devised in the early days of television to allow video frames to be repainted at a high enough rate to prevent visible flickering of the video screen. This is accomplished by scanning alternate lines of a frame in half a frame interval. For example, in a 525-line system, all 525 lines are drawn in one thirtieth of a second, the frame time. The screen is actually repainted every one sixtieth of a second. First every other scan line is drawn (the "top" field), followed by the missed scan lines. A screen repaint of one sixtieth of a second is fast enough to prevent visible flickering.

Frame and Field DCT

Video encoding in MPEG-2 may be either frame-based DCT or field-based DCT. A frame-based DCT encoded video block contains information from both top and bottom fields. A field based DCT encoded block contain information from either top field or bottom field but not both.

Frame-based DCTs are usually used in stationary areas because of the local progressive feature of stationary areas, that is, there is high spatial correlation between the two fields. Field-based DCTs, on the other hand, are often used in areas of motion, where there are significant differences between the two fields. Frame-based DCT's, if used in this situation, will result in significant energy in the high vertical frequency DCT coefficient, reducing the compression efficiency.

MPEG2 Decoder with Embedded Resizing

MPEG2 decoder with embedded resizing is a concept generally known to those in motion video and related industries. A decoder with embedded resizing allows one encoded video source to be decoded onto any supported display format, such as standard NTSC (United States), PAL (Europe), or other display device, using one standard decoder. They have been of great interest because of their relatively low cost in such applications as Standard-Definition ("SD") display of High-Definition ("HD") video streams. Decoders with embedded resizing take advantage of the smaller output format by embedding scalars in the decoding loop. To avoid aliasing, filtering is needed either before or combined with scaling. The filtering/scaling can be done in either the spatial domain or in the DCT domain. The embedded scaling, preferably done in the DCT domain due to its simplicity, reduces the amount of data to be processed in the Inverse Discrete Cosine Transform ("IDCT") and Motion Compensation ("MC") decoding steps.

Additionally, embedded filtering and scaling of DCT encoded video is more useful than non-embedded implementations for other reasons. First, filtering and scaling after full decompression is wasteful of system resources, as larger areas of memory and longer sets of calculations must be performed. Second, advantage can be made of special properties of interlaced video for proper scaling and filtering by allowing DCT encoded blocks to be filtered and scaled dynamically according to their local feature.

Frame and Field Filtering/Scaling

There are also two options for filtering/scaling as well: frame-based and field-based. Frame-based filtering/scaling tends to keep spatial resolution but lose temporal resolution. Field-based filtering/scaling, contrarily, tends to keep temporal resolution but lose spatial resolution. Therefore, to get the best results, frame-based methods should be used in stationary areas and field-based methods should be used in moving areas.

Note that frame- or field-based DCTs are chosen by the encoder, whereas decisions of frame- or field-based filtering/scaling are made by the decoder. The decoder, in the present state of the art, resorts to one of the following two approaches for deciding whether to use frame- or field-based filtering/scaling:

1. Assume the encoder makes the appropriate choices, i.e., frame-DCTs for stationary areas and field-DCTs for moving areas. The decoder simply selects frame- or field-based filtering/scaling based on the DCT type selected by the encoder;
2. Do not trust the encoder at all and always apply the same filtering/scaling mode regardless of the DCT type. Using this approach, field-based filtering/scaling is usually applied to both frame-DCTs and field-DCTs.

The first approach delivers better spatial resolution when the encoder does make the right choice, so that the picture is generally sharper. This approach is, however, vulnerable to bad encoder decisions, such as using frame-DCTs in a moving area, which may lead to some visibly annoying blocks.

The second approach does not risk mixing the two fields, but its picture quality is not as good due to its loss of spatial resolution.

SUMMARY OF THE INVENTION

The present invention provides methods of and systems for addressing the needs of the prior art. These methods and systems provide the ability to determine whether the local area subject to filtering/scaling is a stationary area or an interlaced moving area, and, given such information, dynamically switch between the frame- or field-based operations in a smart way, thereby optimizing the output picture quality.

There is also a need for applying field-based operations on frame DCT encoded blocks to overcome the problems of the prior art. Thus, another object of the invention is the proper filtering/scaling of DCT encoded compressed interlaced video. A DCT-domain-filtering scheme for field-based filtering/scaling of frame-DCT data is provided herein.

When the DCT encoded video block of the compressed video stream is a field-based DCT encoded block, the method includes determining that field-based decoding and filtering/scaling methods are to be used to process the DCT encoded block.

Alternatively, when the DCT encoded block of the compressed video stream is a frame-based DCT encoded block, the method includes obtaining a first absolute value which represents the energy of vertical high frequency of the DCT encoded block of the compressed video stream. Thereafter, this first absolute value is compared to a predetermined first reference value. When the first absolute value is less than or equal to the predetermined first reference value, the method includes determining that frame-based decoding and filtering/scaling methods are to be used to process the DCT encoded block.

Alternatively, when the first absolute value is greater than the predetermined first reference value, the method includes obtaining a second absolute value which represents the energy of vertical mid frequency of the DCT encoded block of the compressed video stream. Advantageously, a second comparison can be conducted in which the second absolute value which represents the energy of vertical mid frequency is compared to a second predetermined reference value. When the second absolute value which represents the energy of vertical mid frequency is less than the second predetermined reference value, the method includes determining that frame-based decoding and field-based and filtering/scaling methods are to be used to process the DCT encoded block.

Alternatively, when the second absolute value which represents the energy of vertical mid frequency is greater than or equal to the second predetermined reference value, the method includes determining that frame-based decoding and filtering/scaling methods are to be used to process DCT encoded block.

Preferably, the video stream includes a plurality of DCT encoded blocks, in which the absolute value of a left-bottom area of a DCT encoded block is used as the first absolute value representing the energy of vertical high frequency of the DCT encoded video block of the compressed video stream, and the absolute value of a left-middle area of a DCT encoded block is used as the second absolute value representing the energy of vertical mid frequency of the DCT encoded block of the compressed video stream.

In another embodiment of the invention, the processing step includes embedded resizing that dynamically chooses frame- or field-based scaling performed within a decoding loop.

In another embodiment of the invention, the processing step includes filtering and scaling of the frame DCT blocks on a field basis.

Since it is possible for interlaced video to be encoded using MPEG-2 frame-based DCT encoded video blocks, it is another object of the present invention to detect interlaced moving areas in frame-based DCT encoded blocks. In this embodiment, the invention relates to a method of detecting whether an area of a compressed video stream is an interlaced moving area, where the area of the compressed video stream is represented by a plurality of frame DCT encoded blocks. The method includes obtaining a DCT encoded video block of the compressed video stream and thereafter obtaining a first absolute value which represents the energy of vertical high frequency of the DCT encoded block of the compressed video stream. Next, the absolute value is compared to a predetermined first reference value.

When the first absolute value is less than or equal to the predetermined first reference value, the method includes determining that the area of the compressed video stream represented by the DCT encoded block is not an interlaced moving area.

Alternatively, when the first absolute value is greater than the predetermined first reference value, the method includes obtaining a second absolute value which represents the energy of vertical mid frequency of the DCT encoded block of the compressed video stream. Thereafter, a second comparison is conducted in which the second absolute value which represents the energy of vertical mid frequency is compared to a second predetermined reference value.

When the second absolute value which represents the energy of vertical mid frequency is less than the second predetermined reference value, the method includes determining that the area of the compressed video stream represented by the DCT encoded block is an interlaced moving area.

Alternatively, when the second absolute value which represents the energy of vertical mid frequency is greater than or equal to the second predetermined reference value, the method includes determining that the area of the compressed video stream represented by the DCT encoded block is not an interlaced moving area.

Again, preferably, the video stream includes a plurality of DCT encoded blocks, in which the absolute value of a left-bottom area of a DCT encoded block is used as the first absolute value representing the energy of vertical high frequency of the DCT encoded video block of the compressed video stream, and the absolute value of a left-middle area of a DCT encoded block is used as the second absolute value representing the energy of vertical mid frequency of the DCT encoded block of the compressed video stream.

The invention also relates to a system for processing a compressed video stream represented by a plurality of DCT encoded blocks. This system includes a video signal source of the compressed video stream, a processor operatively coupled to the video signal source, and a video output.

The processor is configured to conduct the method described herein.

In another embodiment of the invention, the system includes computer-readable memory as the video signal source.

In another embodiment of the invention, the system includes computer-readable memory as the video output.

Other improvements which the present invention provides over the prior art will be identified as a result of the following description which sets forth the preferred embodiments of the present invention. The description is not in any way intended to limit the scope of the present invention, but rather only to provide a working example of the present preferred embodiments. The scope of the present invention will be pointed out in the appended claims.

BRIEF DESCRIPTION OF THE DRAWINGS

FIG. 6 is a diagram showing an 8×8 DCT block with sample left-middle and left-bottom coefficients indicated.

DETAILED DESCRIPTION OF THE INVENTION

The present invention provides a method of and system for processing a compressed video stream represented by a plurality of DCT encoded blocks. A video stream compressed using the MPEG-2 standard is such a compressed video stream.

Figure 1:
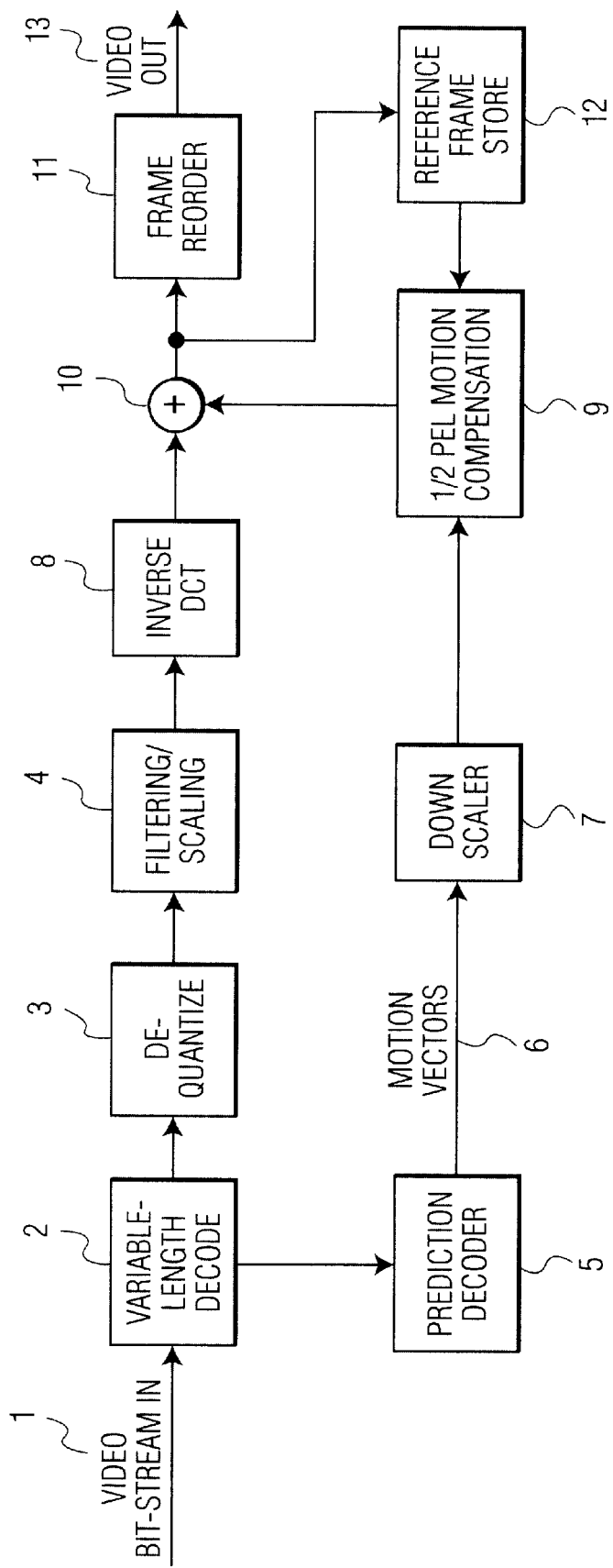
FIG. 1 is a block diagram illustrating an MPEG-2 decoder with embedded resizing according to the prior art.

An MPEG-2 decoder with embedded resizing according to the prior art is illustrated in FIG. 1. A compressed MPEG-2 video bitstream 1 first is subjected to variable length decoding 2, wherein encoded video is split into component discrete cosine transform ("DCT") blocks. The DCT blocks proceed to dequantization (inverse scan inverse quantization) 3, then to a filtering/scaling procedure 4, then to inverse DCT processing 8, and on to an adder 10. The prediction decoder 5 generates motion vectors 6. These motion vectors 6 are processed by a down scaler 7 and then used in ½ pel motion compensation 9. The result of ½ pel motion compensation 9 is added to the results already sent to the adder 10 from inverse DCT processing 8.

Reference frames proceed from the adder 10 to the reference frame store 12, where they are available to the motion compensation 9. The frames collected at the adder 10 are further processed to place the frames in their proper order by frame reorder logic 11. The decompressed video frames are output 12.

Figure 2:
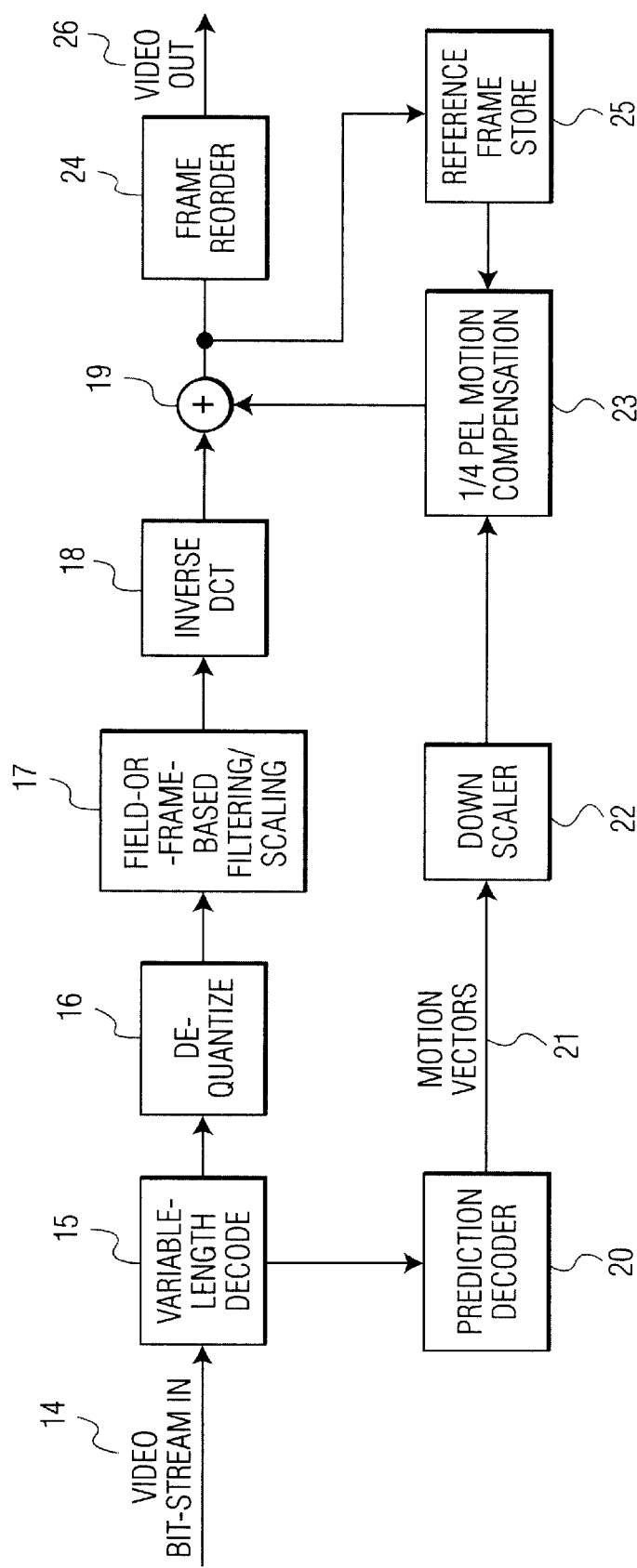
FIG. 2 is a block diagram illustrating one embodiment of an MPEG-2 decoder with embedded resizing according to the present invention.
Figure 3:
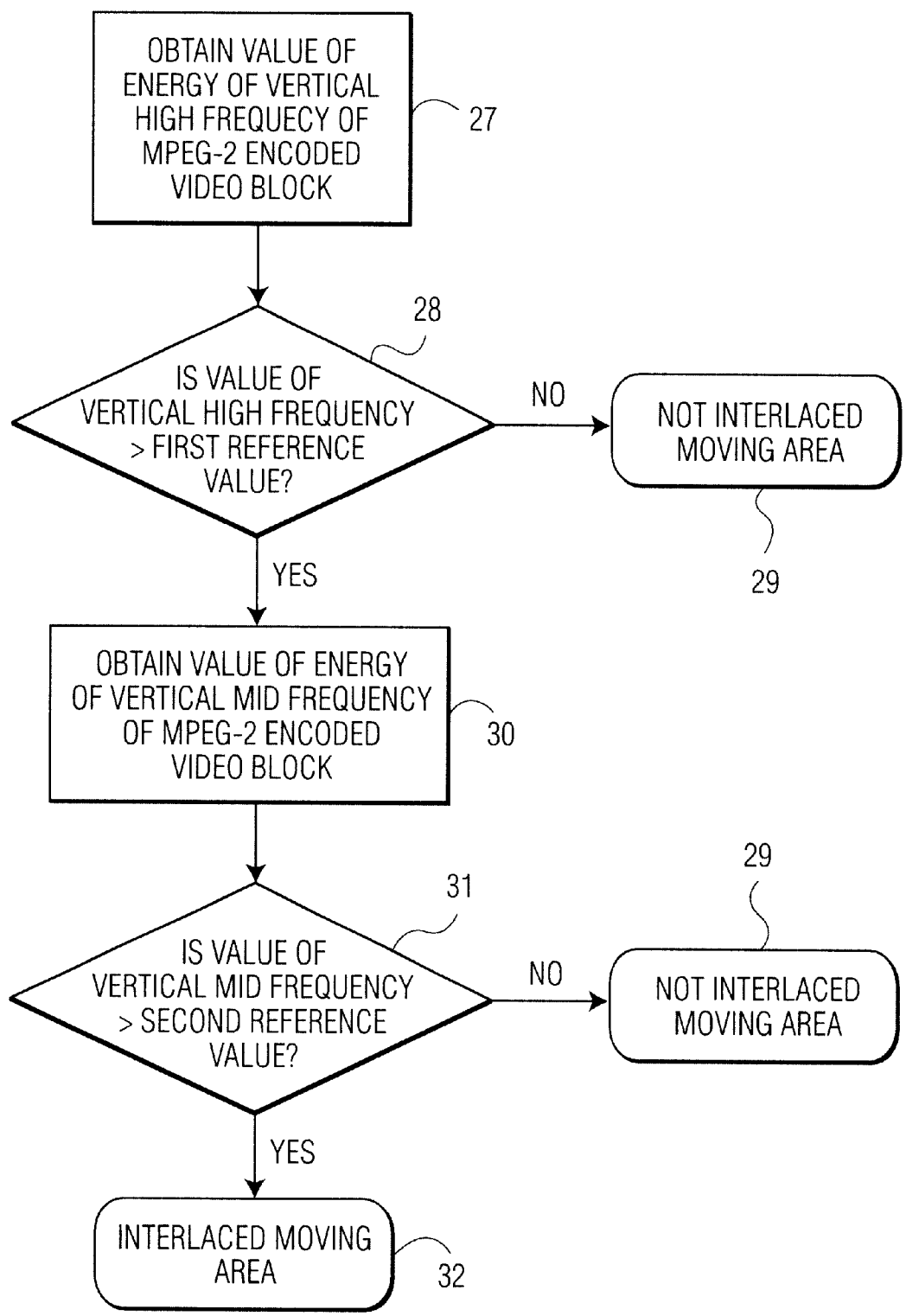
FIG. 3 is a flowchart diagram illustrating operation of one embodiment of the present invention.

Referring now to FIG. 2, a block diagram illustrating one embodiment of an MPEG-2 decoder with embedded resizing according to the present invention is shown. An MPEG-2 encoded video bitstream 14 enters the first stage of decompression, the variable length decoder 15, where the DCT blocks are routed to be dequantized 16 (via inverse scanning inverse quantization). Next, a procedure is applied that is a subject of this invention to determine whether field- or frame-based filtering/scaling will be used 17. The details of this implementation of the inventive method for determining which type of filtering/scaling to use is depicted by FIG. 3 and will be further detailed below.

Next, the filtered/scaled result of the procedure employed for filtering/scaling 17 is processed by inverse DCT 18. The result of inverse DCT 18 is then passed to the adder 19.

The prediction decoder 20 generates motion vectors 21. These then pass to the down scalar 22. The result of the down scalar 22 proceeds to the ¼ pel motion compensation 23. The result of motion compensation is then sent to the adder 19.

Reference frames proceed from the adder 19 to the reference frame store 25, where they are available for motion compensation 23. The frames collected at the adder 19 are further processed to place the frames in their proper order by frame reorder logic 24. The decompressed video frames are output 26.

Referring now to FIG. 3, a flowchart diagram illustrating one embodiment of a method according to the present invention is shown. As used herein, the "first absolute value representing the energy of vertical high frequency" is the measure of the magnitude or size of the DCT coefficients of the left-bottom-hand corner of the DCT encoded block. Such a measure is known to those of normal skill in the art.

Similarly, as used herein, "second absolute value representing the energy of vertical mid frequency" is the measure of the magnitude or size of the DCT coefficients of the left-middle of the DCT encoded block. This type of measure is also known to those of normal skill in the art.

"Predetermined first reference value" and "predetermined second reference value", as used herein, are experimentally-determined numbers representing the decision points for the "first absolute value representing the energy of vertical high frequency" and the "second absolute value representing the energy of vertical mid frequency".

A "predetermined first value" is determined by comparing the left-bottom corner frame DCT coefficients of compressed video blocks representing interlaced non-moving areas to the left-bottom corner frame DCT coefficients of compressed video blocks representing interlaced, moving area. These are examined to determine at what absolute value of DCT coefficient the interlaced moving area can be told apart from interlaced non-moving area. This absolute value becomes the "predetermined first value" to catch the frame high-pass feature of interlaced moving area.

In a similar fashion, a "predetermined second value" is determined by comparing the vertical middle frequency DCT coefficients of compressed video blocks representing interlaced moving areas to the vertical middle frequency DCT coefficients of compressed video blocks representing areas with vertical high frequency not caused by interlacing, for example, noisy areas. These are examined to determine at what absolute value of vertical middle frequency DCT coefficient the interlaced moving area can be told apart from areas with similar vertical high frequency, but not resulted from interlacing, such as noisy areas. This absolute value becomes the "predetermined second value" to catch the field low-pass feature of interlaced moving area.

The value of the energy of vertical high frequency is first obtained for a given DCT encoded video block 27. The absolute value of this obtained energy of vertical high frequency is compared with a first reference value 28, which may be obtained in any of several ways, including by experimentation. If the absolute value of this obtained energy of vertical high frequency is less than or equal to the first reference value, the conclusion reached is that the given DCT encoded video block does not represent an interlaced moving area of video 29.

Otherwise, if the absolute value of this obtained energy of vertical high frequency is greater than the first reference value, obtain value of the energy of vertical mid frequency for the given DCT encoded video block 30. The absolute value of this obtained energy of vertical mid frequency is then compared with a second reference value 31, which may also be obtained in any of several ways, including by experimentation. If the absolute value of this obtained energy of vertical mid frequency is greater than or equal to the second reference value, the conclusion reached is that the given DCT encoded video block does not represent an interlaced moving area of video 29.

Finally, if the absolute value of this obtained energy of vertical mid frequency is less than the second reference value, the conclusion reached is that the given DCT encoded video block represents an interlaced moving area of video 32.

Figure 4:
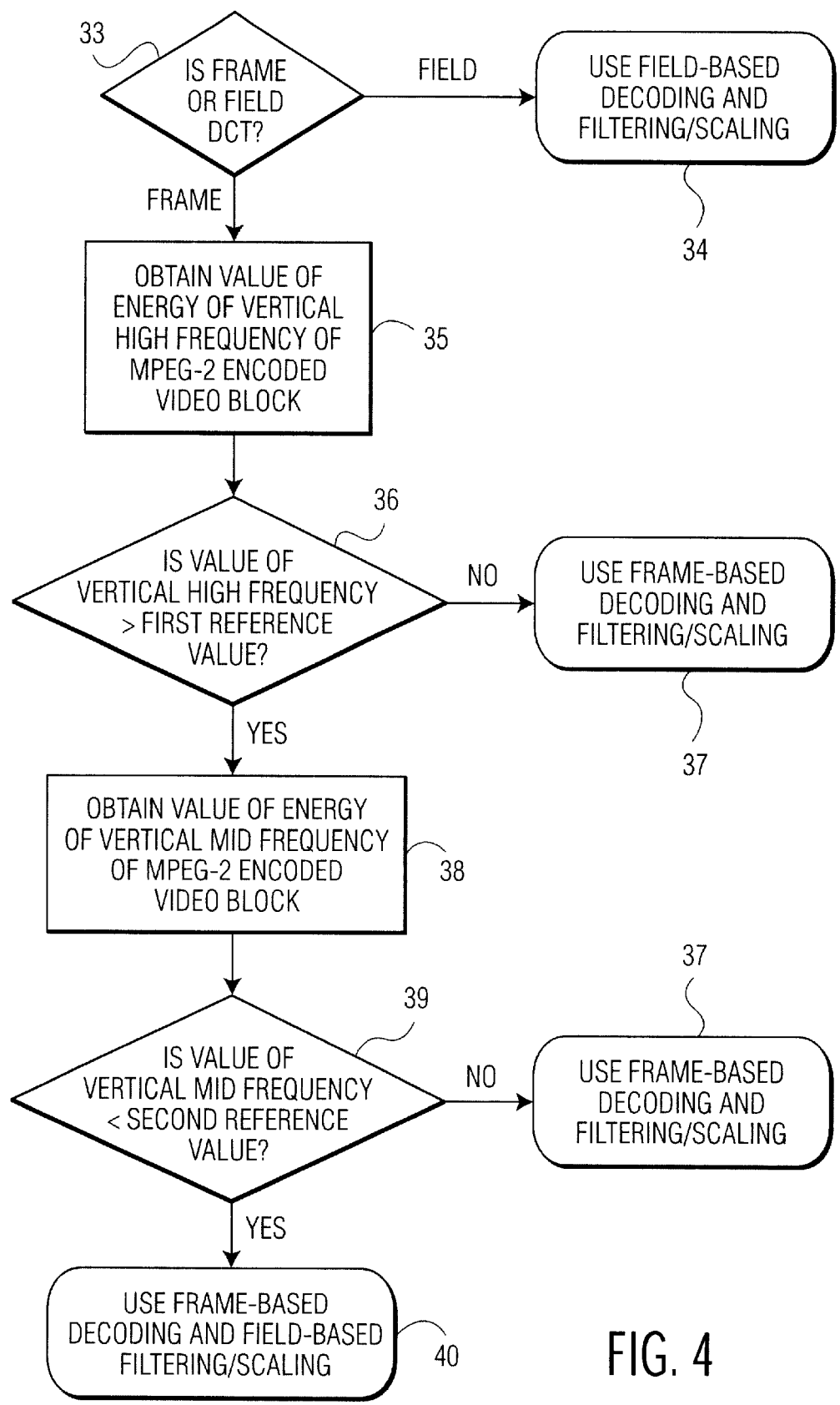
FIG. 4 is a flowchart diagram illustrating operation of another embodiment of the present invention.

Referring now to FIG. 4, a flowchart diagram illustrating another embodiment of a method according to the present invention is shown. Herein, a similar procedure to that of FIG. 3 is employed to determine whether to use field- or frame-based filtering/scaling for a given DCT encoded video block.

First, the DCT encoded video block is examined to determine whether it is a field or frame DCT 33. If it is a field DCT block, field-based decoding and field-based filtering/scaling are to be used on the DCT encoded video block 34.

Otherwise, if the DCT encoded video block is a frame DCT block, obtain the value of the energy of vertical high frequency of the DCT encoded video block 35. The absolute value of this energy of vertical high frequency is then compared with a first reference value 36. This first reference value may be obtained in any of several ways, including experimentation. If the absolute value of the energy of vertical high frequency is less than or equal to the first reference value, frame-based decoding and frame-based filtering/scaling methods are to be used on the DCT encoded video block 37.

Otherwise, if the absolute value of the energy of vertical high frequency is greater than the first reference value, obtain the value of the energy of vertical mid frequency of the DCT encoded video block 38. The absolute value of this energy of vertical mid frequency is then compared with a second reference value 39. This second reference value also may be obtained in any of several ways, including experimentation. If the absolute value of this energy of vertical mid frequency is greater than or equal to the second reference value, frame-based decoding and frame-based filtering/scaling methods are to be used on the DCT encoded video block 37.

Otherwise, if the absolute value of this energy of vertical mid frequency is less than the second reference value, frame-based decoding and field-based filtering/scaling methods are to be used on the DCT encoded video block 40.

Figure 5:
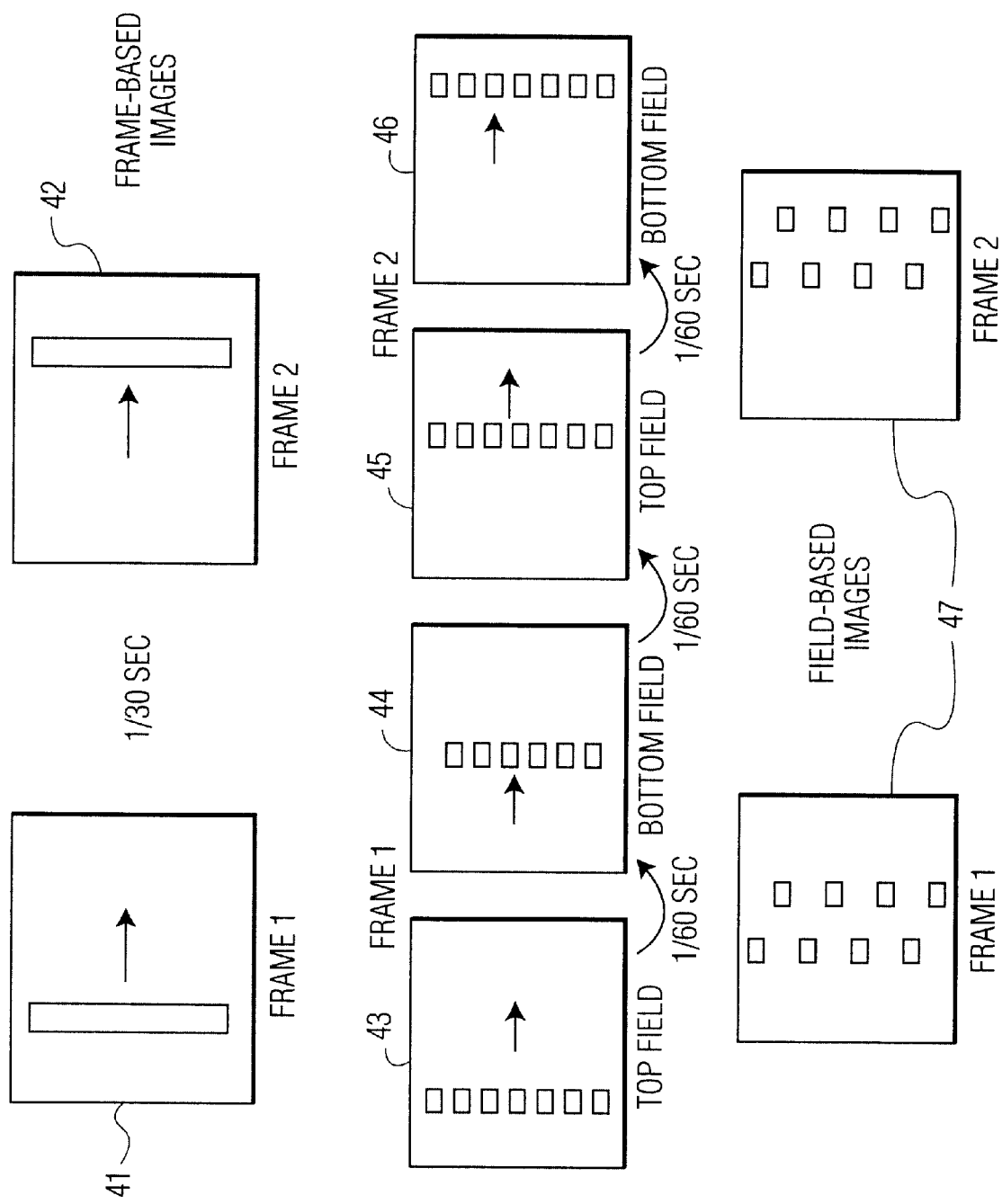
FIG. 5 is a diagram showing distortion of a vertical line moving horizontally in an interlaced video sequence.

Referring now to FIG. 5, it diagrams the distortion of a vertical line moving horizontally in both a progressive and an interlaced video sequence. In a progressive sequence the vertical line first appears as a straight line from the top to the bottom, since every scan line is drawn 41. One thirtieth of a second later, the line is redrawn after moving 42. Both frames display the line as straight 41, 42.

In the interlaced sequence the vertical line first appears as a vertical dotted line because only every other scan line is drawn 43. One sixtieth of a second later the alternate scan lines are drawn, but the line has already been displaced some horizontal distance 44. This repeats for the two fields of frame 2, namely 45, 46. The end result is that there is blurring of the vertical line along the horizontal direction 47.

This blurring of moving vertical edges gives rise to high values of "vertical high frequency" within the DCT encoded blocks for the moving areas. Vertical high frequency can be measured by sampling the left-bottom corner of the DCT block. A high absolute value compared with a predetermined level for this measurement is indicative of a moving interlaced area. To distinguish between true moving interlaced areas and other cases which give rise to vertical high frequency, such as the presence of noise, the DCT block may be sampled at "vertical mid frequency", roughly the center left of a DCT block. Absolute values below a predetermined level are indicative of a moving interlaced area. This second sampling of the DCT block has no indicative value by itself, i.e. it is useful when combined with the first sampling of the DCT block in vertical high frequency. The first sampling, however, is standalone. It may be used to detect interlaced an moving area. The second sampling is used to reduce the probability of a false positive, or detection of an interlaced moving area, from the first sampling. A simplified version of the method can be used by omitting the second sampling. This would still work, but with maybe a higher error rate.

Referring now to FIG. 6, an 8×8 DCT block is displayed 48. The individual coefficients of the DCT block are numbered 0'–63' for reference purposes. For the uses described herein and as is known in the art, a "left-middle" DCT coefficient or element 49 is at or near the coefficient position 32'. Similarly, a "left-bottom" DCT coefficient or element 50 is at or near the coefficient position 56'.

Once interlacing is detected, filtering should be done on a field basis. For a scaling factor of 2, for example, a [0.5, 0, 0.5] filter in the spatial domain will work. The zero in the middle masks out the contribution from the second field, thus it is equivalent to apply a [0.5, 0.5] filter to one field. If the proper phase shift is considered, a [0.75, 0, 0.25] filter can be used for the top field and a [0.25, 0, 0.75] filter can be used for the bottom field. A spatial-domain scaling-matrix, with a downscaling factor of 2, can therefore be obtained using these filters. The following spatial-domain scaling-matrix is illustrative of one applicable to interlaced moving area frame DCT encoded blocks:

| | | | | | | | | |
|---|---|---|---|---|---|---|---|---|
| | 0.75 | 0 | 0.25 | 0 | 0 | 0 | 0 | 0 | |
| | 0 | 0.25 | 0 | 0.75 | 0 | 0 | 0 | 0 | |
| | 0 | 0 | 0 | 0 | 0.75 | 0 | 0.25 | 0 | |
| | 0 | 0 | 0 | 0 | 0 | 0.25 | 0 | 0.75 | |

This spatial-domain scaling-matrix can be further converted to the DCT domain to simplify complexity.

Although the system and method of the present invention has been described in connection with the described embodiments, it is not intended to be limited to the specific form set forth herein, but on the contrary, it is intended to cover such alternatives, modifications, and equivalents as can be reasonably included within the spirit and scope of the invention as defined by the appended claims.

What is claimed is:

1. A method of processing a compressed video stream, in which said compressed video stream is represented by a plurality of discrete cosine transform ("DCT") encoded blocks, said method comprising:

when a DCT encoded block of said compressed video stream is a field-based DCT encoded block, determining that field-based decoding and filtering/scaling methods are to be used to process said DCT encoded block; or when a DCT encoded block of said compressed video stream is a frame-based DCT encoded block, obtaining a first absolute value which represents the energy of vertical high frequency of said DCT encoded block of said compressed video stream; and comparing said first absolute value to a predetermined first reference value; and (a) when said first absolute value is less than or equal to said predetermined first reference value, determining that frame-based decoding and filtering/scaling methods are to be used to process said DCT encoded block; or (b) when said first absolute value is greater than said predetermined first reference value, obtaining a second absolute value which represents the energy of vertical mid frequency of said DCT encoded block of said compressed video stream; and conducting a second comparison in which said second absolute value which represents the energy of vertical mid frequency is compared to a second predetermined reference value; and (i) when said second absolute value which represents the energy of vertical mid frequency is less than said second predetermined reference value, determining that frame-based decoding and field-based and filtering/scaling methods are to be used to process said DCT encoded block; or (ii) when said second absolute value which represents the energy of vertical mid frequency is greater than or equal to said second predetermined reference value, determining that frame-based decoding and filtering/scaling methods are to be used to process said DCT encoded block.

2. The method of claim 1, wherein said video stream includes a plurality of DCT encoded blocks, in which the absolute value of a left-bottom area of a DCT encoded block is used as said first absolute value representing the energy of vertical high frequency of said DCT encoded block of said compressed video stream, and the absolute value of a left-middle area of a DCT encoded block is used as said second absolute value representing the energy of vertical mid frequency of said DCT encoded block of said compressed video stream.

3. The method of claim 1, wherein said processing of said compressed video stream includes embedded resizing that dynamically chooses frame- or field-based scaling performed within a decoding loop.

4. The method of claim 1, wherein said processing of said compressed video stream includes filtering and scaling of said frame-based DCT encoded blocks on a field basis.

5. A method of detecting whether an area of a compressed video stream is an interlaced moving area, in which said area of a compressed video stream is represented by a plurality of frame DCT encoded blocks, said method comprising:

obtaining a DCT encoded block of said compressed video stream; and obtaining a first absolute value which represents the energy of vertical high frequency of said DCT encoded block of said compressed video stream; and comparing said first absolute value to a predetermined first reference value; and (a) when said first absolute value is less than or equal to said predetermined first reference value, determining that the area of said compressed video stream represented by said DCT encoded block is not an interlaced moving area; or (b) when said first absolute value is greater than said predetermined first reference value, obtaining a second absolute value which represents the energy of vertical mid frequency of said DCT encoded block of said compressed video stream; and conducting a second comparison in which said second absolute value which represents the energy of vertical mid frequency is compared to a second predetermined reference value; and (i) when said second absolute value which represents the energy of vertical mid frequency is less than said second predetermined reference value, determining that the area of said compressed video stream represented by said DCT encoded block is an interlaced moving area; or (ii) when said second absolute value which represents the energy of vertical mid frequency is greater than or equal to said second predetermined reference value, determining that the area of said compressed video stream represented by said DCT encoded block is not an interlaced moving area.

6. The method of claim 5, wherein said video stream includes a plurality of DCT encoded blocks, in which the absolute value of a left-bottom area of a DCT encoded block is used as said first absolute value representing the energy of vertical high frequency of said DCT encoded block of said compressed video stream, and the absolute value of a left-middle area of a DCT encoded block is used as said second absolute value representing the energy of vertical mid frequency of said DCT encoded block of said compressed video stream.

7. A system for processing a compressed video stream, in which said video stream is represented by a plurality of DCT encoded blocks, said system comprising:

a video signal source of said compressed video stream; and a processor operatively coupled to said video signal source, and a video output, said processor configured to:

obtain a DCT encoded block from said compressed video stream; and determine when said DCT encoded block is a field-based DCT encoded block and apply field-based decoding and filtering/scaling to said DCT encoded block; or when said DCT encoded block is a frame-based DCT encoded block, obtain a first absolute value of the energy of vertical high frequency of said given area in an said DCT encoded block; and compare said first absolute value of the energy of vertical high frequency to a predetermined first reference value; and (a) when said first absolute value is less than or equal to said predetermined first reference value, apply frame-based decoding and filtering/scaling to said DCT encoded block; or (b) when said first absolute value is greater than said predetermined first reference value, obtain a second absolute value which represents the energy of vertical mid frequency of said DCT encoded block of said compressed video stream; and conducting a second comparison in which said second absolute value which represents the energy of vertical mid frequency is compared to a second predetermined reference value; and (i) when said second absolute value which represents the energy of vertical mid frequency is less than said second predetermined reference value, apply frame-based decoding and field-based filtering/scaling to said DCT encoded block; or (ii) when said second absolute value which represents the energy of vertical mid frequency is greater than or equal to said second predetermined reference value, apply frame-based decoding and filtering/scaling to said DCT encoded block; and place processed video onto said video output.

8. The system of claim 7, wherein said compressed video stream includes a plurality of DCT encoded blocks, in which the absolute value of a left-bottom area of a DCT encoded block is used as said first absolute value representing the energy of vertical high frequency, and the absolute value of a left-middle area of a DCT encoded block is used as said second absolute value representing the energy of vertical mid frequency.

9. The system of claim 7, wherein said video signal source is a computer-readable memory.

10. The system of claim 7, wherein said video output means is computer-readable memory.

11. The system of claim 7, wherein processing of said compressed video stream includes filtering and scaling of said frame DCT blocks on a field basis.

12. A system for detecting whether an area of a compressed video stream is an interlaced moving area, in which said video stream is represented by a plurality of DCT encoded blocks, said system comprising:

a video signal source of said compressed video stream; and a processor operatively coupled to said video signal source, and a logic output, said processor configured to:

obtain a DCT encoded block from said compressed video stream; and obtain a first absolute value of the energy of vertical high frequency of said given area in an said DCT encoded block; and compare said first absolute value of the energy of vertical high frequency to a predetermined first reference value; and (a) when said first absolute value is less than or equal to said predetermined first reference value, determine that said DCT encoded block does not represent an interlaced moving area of said compressed video and setting the logic output to a FALSE value to indicate this; or (b) when said first absolute value is greater than said predetermined first reference value, obtain a second absolute value which represents the energy of vertical mid frequency of said DCT encoded block of said compressed video stream; and conducting a second comparison in which said second absolute value which represents the energy of vertical mid frequency is compared to a second predetermined reference value; and (i) when said second absolute value which represents the energy of vertical mid frequency is less than said second predetermined reference value, determine that said DCT encoded block represents an interlaced moving area of said compressed video and setting the logic output to a TRUE value to indicate this; or (ii) when said second absolute value which represents the energy of vertical mid frequency is greater than or equal to said second predetermined reference value, determine that said DCT encoded block does not represent an interlaced moving area of said compressed video and setting the logic output to a FALSE value to indicate this.

13. The system of claim 12, wherein said compressed video stream includes a plurality of DCT encoded blocks, in which the absolute value of a left-bottom area of a DCT encoded block is used as said first absolute value representing the energy of vertical high frequency, and the absolute value of a left-middle area of a DCT encoded block is used as said second absolute value representing the energy of vertical mid frequency.

14. The system of claim 12, wherein said video signal source is a computer-readable memory.

* * * * *